United States Patent
Wasak et al.

[19]

[11] Patent Number: 5,993,560
[45] Date of Patent: Nov. 30, 1999

[54] OPTICAL SURFACES CLEANING DEVICES, COMPOSITIONS AND METHODS

[76] Inventors: Wojciech Wasak, 313 - 131 West 4th Street, North Vancouver; Moshe Ravid, 771 West 23rd Avenue, Vancouver, both of Canada

[21] Appl. No.: 08/888,020

[22] Filed: Jul. 3, 1997

Related U.S. Application Data

[63] Continuation of application No. 08/211,311, filed as application No. PCT/CA91/00354, Oct. 4, 1991, abandoned.

[51] Int. Cl.$^6$ .............................. B05C 17/00; B08B 1/00; B08B 7/00
[52] U.S. Cl. .................................. 134/6; 134/42; 15/214; 15/114; 15/230; 15/230.18; 15/104.94; 15/97.1; 206/5.1
[58] Field of Search ........................... 134/6, 42; 15/214, 15/114, 230, 230.18, 104.94, 97.1; 206/5.1; 510/112, 113, 163, 395, 396

[56] References Cited

U.S. PATENT DOCUMENTS

| | | | |
|---|---|---|---|
| 1,617,838 | 2/1927 | Fennell | 15/230.18 |
| 1,706,402 | 3/1929 | Hawn | 15/230.18 |
| 1,796,787 | 3/1931 | Hatfield | 15/230 X |
| 3,134,208 | 5/1964 | Richmond | 51/235 |
| 4,546,517 | 10/1985 | Caniglia | 15/214 |
| 4,644,703 | 2/1987 | Kaczmarek et al. | 51/401 |
| 4,842,132 | 6/1989 | Wells | 15/114 X |
| 5,000,204 | 3/1991 | Smith | 134/6 |

OTHER PUBLICATIONS

World Patent Index—Latest—Acc No. 86–186120/29 (Abstract of JP A611118499) Jun. 5, 1986.

*Primary Examiner*—Zeinab El-Arini
*Attorney, Agent, or Firm*—Paul Smith Intellectual Property Law; Paul Smith

[57] ABSTRACT

Devices and compositions are provided for cleaning optical surfaces with carbon black. Carbon black may be impregnated on a soft pad, such as chamois leather, to provide a lens cleaning device. The soft pad may be supported on a handle. The soft pad may be mounted on the handle by a resilient member that is capable of adapting with the soft pad to conform the cleaning surface to concave or convex optical surfaces. A retractable brush may be mounted at the opposite end of the handle from the soft pad.

35 Claims, 4 Drawing Sheets

OPTICAL SURFACES CLEANING DEVICES, COMPOSITIONS AND METHODS

This application is a continuation of application Ser. No. 08/211,311, filed on Oct. 4, 1994, now abandoned, which was a rational stage application of PCT/CA91/00354 filed Oct. 4, 1991.

BACKGROUND OF THE INVENTION

1. Field of the Invention

This invention relates to lens cleaning devices, particularly those having concave pads thereon, lens cleaning compositions, in particular compositions including carbon black, and methods for cleaning lenses using such devices and compositions.

2. Description of Related Art

Articles and instruments such as cameras, lens, binoculars, telescopes, view finders, magnifiers, theodolites and other devices having optical surfaces performed best when the optical surfaces are kept clean. On the one hand, the cleaning must be sufficient to remove fingerprints, dust, oily deposits and greasy or rain water residues. On the other hand, the cleaning must not damage relatively delicate plastic or optically coated surfaces.

Commonly a brush or blower, or a combination of both, is used to clean camera lenses and the like. However, these devices are really only effective in removing dust, sand and other loose particles. Fingerprints and other more permanent residues are usually removed using a soft cloth, chamois or tissue paper with or without a cleaning fluid.

Various articles have been developed to hold and support such means for wiping lenses. Examples are found in U.S. Pat. No. 2,055,314 to Seburger, 2,458,015 to McDonald, 2,880,441 to Rushing Jr., 4,480,252 to Eggett and 4,546,517 to Caniglia.

Such prior art devices and methods have certain limitations and disadvantages. For example, blowers or brushes merely remove dust or loose particles. Wiping devices and materials do not quickly or effectively remove greasy residues when used dry and may spread oily spots over the cleaned surfaces, causing flare and diffusion of the image. The use of a solvent is helpful, but this means that the user must carry around a bottle of solvent which has to be opened, applied, and wiped dry with a tissue or other wiper which is relatively inconvenient. In addition, disposable tissues contribute to litter when they are tossed away by careless users. Thus the prior art creates the need for a more effective and convenient lens cleaner and lens cleaning method.

SUMMARY OF THE INVENTION

To overcome the disadvantages in the prior art and provide more effective cleaning of lenses, the invention provides a lens cleaner with a member of a soft, flexible material. The member has sides, a first end and a second end, the first end having a concave cleaning surface. The sides taper towards the second end. The member may be impregnated with carbon black.

In a preferred form, the lens cleaner has a pen-like body with a brush at a first end thereof.

Another aspect of the invention provides a lens cleaning composition in a form of a cake of material which includes carbon black. Preferably the cake has a hardness of 2 or less on the Mohs scale.

The cake may include hydrated calcium sulphate. In a preferred form, the cake is generally 95% hydrated calcium sulphate and 5% carbon black.

The invention overcomes disadvantages in the prior art by providing a convenient lens cleaning device which conforms to the surface shape of lenses and cleans right to the edges thereof.

Lens are cleaned more thoroughly by employing soft wipers impregnated with carbon black which remove fingerprints, oily residues and the like without the need for liquid lens cleaning solutions.

DESCRIPTION OF THE PREFERRED EMBODIMENTS

Figure 1:
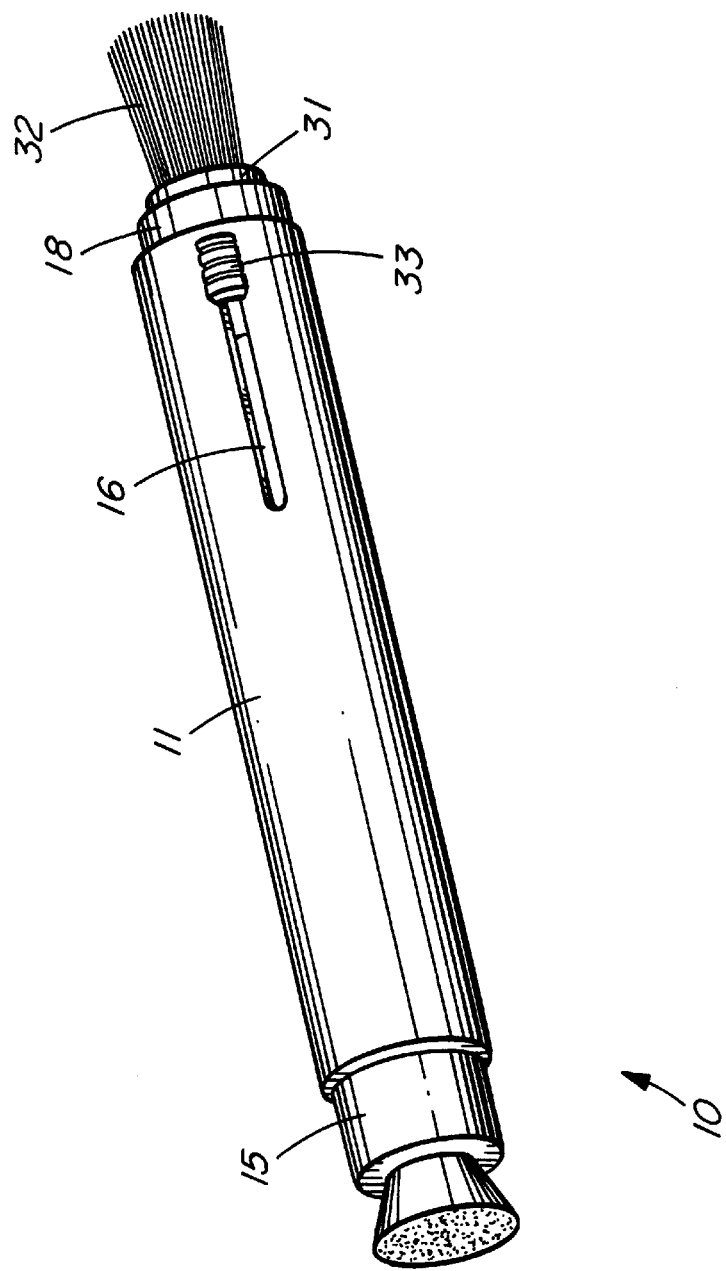
FIG. 1 is an isometric view of a lens cleaning device according to an embodiment of the invention with the cap removed from one end thereof.

Referring to FIG. 1 this shows a lens cleaning device 10 having a cylindrical barrel 12 which serves as a handle and is made of plastic in this embodiment although it could be of metal or other rigid materials. The barrel has a first end 14 and a second end 16. There is a portion of the barrel 18 extending from the first end 14 to a shoulder 22 which has a reduced diameter. A portion 20 with the same diameter extends from second end 16 to shoulder 24. Both of these portions have a diameter sized to snuggly receive a cap 26.

There is a brush 28 connected to the barrel at second end 16. The brush has a plurality of bristles 30 and is deployable to the extended position shown in FIG. 1 using a finger grip 32 which is slidable along a slot 34 extending longitudinally along the barrel. The bristles can be retracted by pushing finger grip 32 to the left, from the point of view of FIG. 1, to the opposite end of slot 34.

Figure 3:
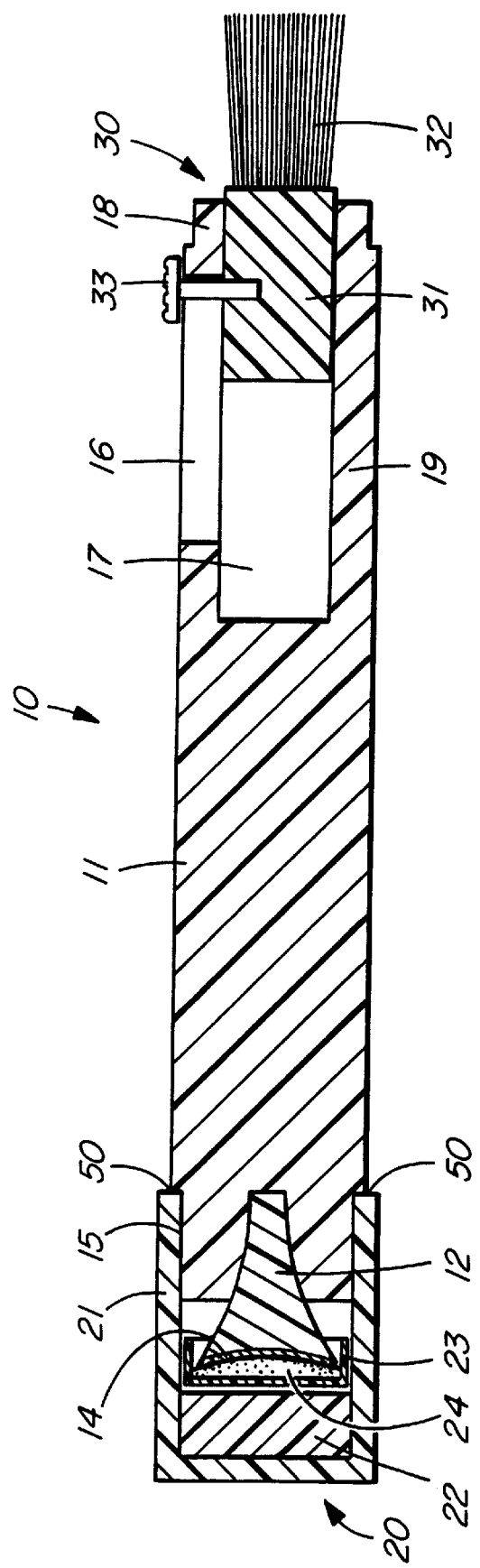
FIG. 3 is a longitudinal section of the device of FIG. 1 with the cap in place.

Referring to the sectional view of FIG. 3, it may be seen that the bristles are embedded in a cylindrical member 36 which is reciprocatingly received within a cylinder 38 which extends axially inwards from end 16 of the barrel. The finger grip 32 has a stem 40 which extends through slot 34 and is tightly received within a correspondingly shaped aperture in member 36.

Figure 5:
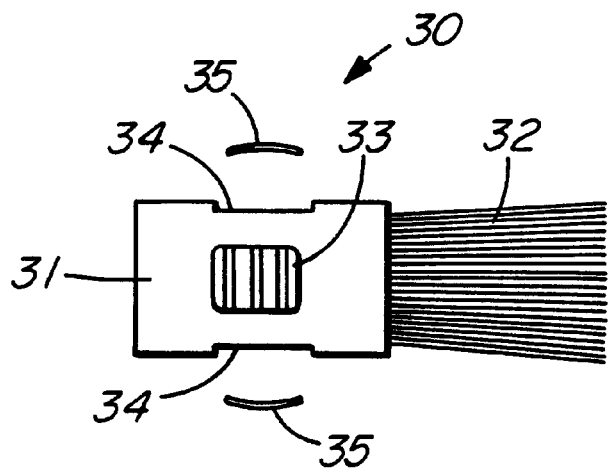
FIG. 5 is an exploded view of the brush assembly from the device FIG. 1.

As seen in FIG. 5, member 36 has recesses 42 and 44 on each side of the finger grip 32. The recesses receive a pair of leaf springs 46 and 48 when the device is assembled. The recesses are slightly longer than the leaf springs to accommodate them when they are flattened as the member 36 is inserted into cylinder 38. The leaf springs tend to hold the member 36 in the desired position along cylinder 38.

Figure 2:
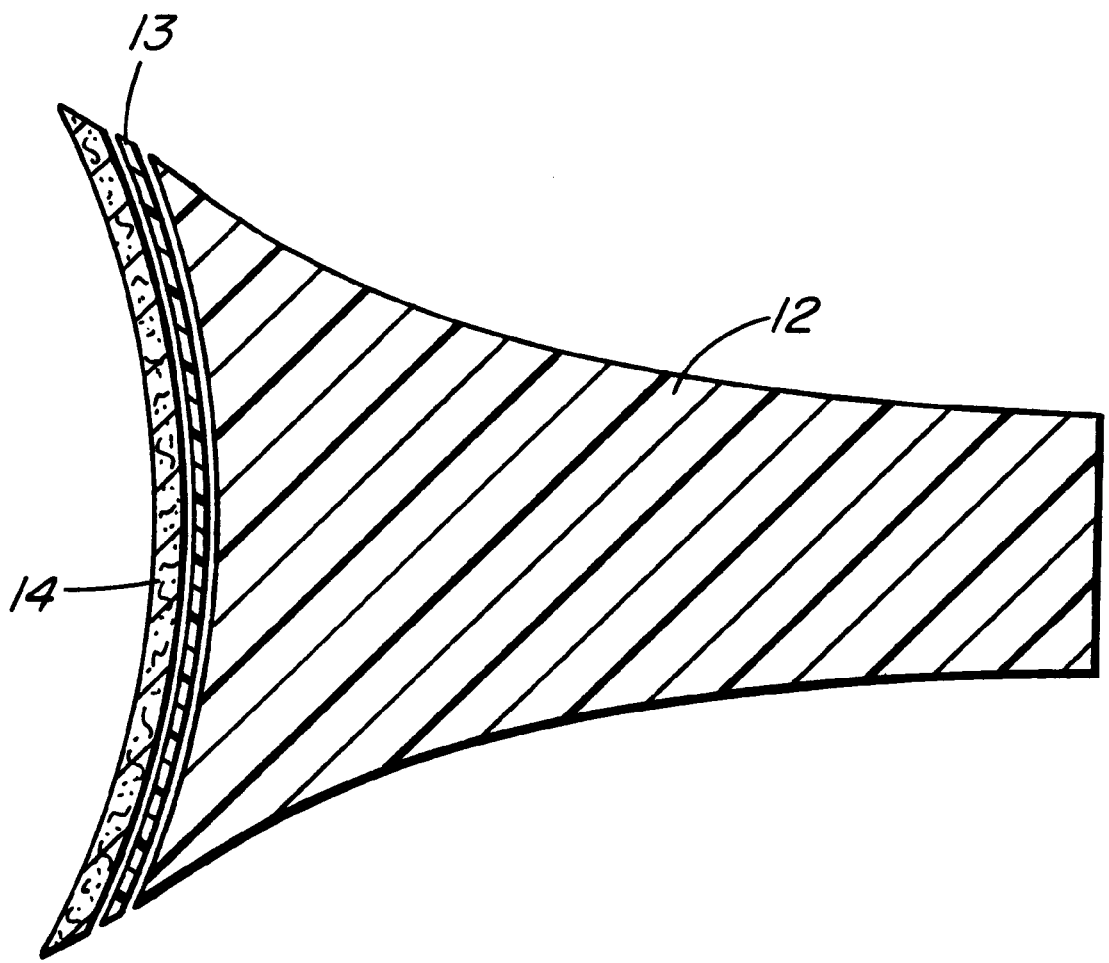
FIG. 2 is a longitudinal section of the cleaning pad from the device of FIG. 1.

Referring to FIGS. 1, 2 and 3, there is a frustoconical shaped-pad member 50 at end 14 of the barrel. The member tapers in the direction towards the barrel and is held within a frustoconical shaped recess 52 which extends axially inwards from end 14 of the barrel. The member is of a soft, resilient material, polyurethane in this example, although other materials could be substituted. Member 50 is held in position within the recess by an adhesive. The sides 53 of member 50 are concave in this example, making the member somewhat bell-shaped.

As may be appreciated from FIG. 1, 2, 3 and 4, member 50 has a circular outer end 54 which is concave. As seen FIG. 2, a pad 56, which is circular in this embodiment, is affixed to end 54 of member 50 by means of an adhesive 57. In this particular embodiment the pad 56 is of chamois leather, but other soft materials suitable for wiping lenses could be substituted such as a synthetic chamois or a soft cloth. The pad member forms a support body for the pad.

Cap 26 is used to cover pad number 50 when the latter is not in use as shown in FIG. 3. There is a cake 58 of material for cleaning lenses located within the cap 26 and positioned to contact pad 56 when the cap is fitted over portion 18 of the barrel snug against shoulder 22 as shown in FIG. 3. The cake 58 is circular and somewhat meniscus shaped in this embodiment. It is comprised of carbon black (commonly known as soot) in combination with hydrated calcium sulfate ($CaSO_4 2H_2O$). Carbon black has been found to be a most suitable material for cleaning optical surfaces. It is believed to clean on the principle of adsorption. In this embodiment approximately 5% carbon black is mixed with 95% of hemihydrate of calcium sulfate. Water is added to make a paste which is allowed to dry and form the cake 58 which then comprises a mixture of hydrated calcium sulfate and carbon black. Cake 58 is received within a cup 60 which is slidingly received within cap 26. The cake is affixed inside the cup, as seen in FIG. 3, using a suitable adhesive. The calcium sulfate is used to form the cake and improve the cleaning action.

Figure 4:
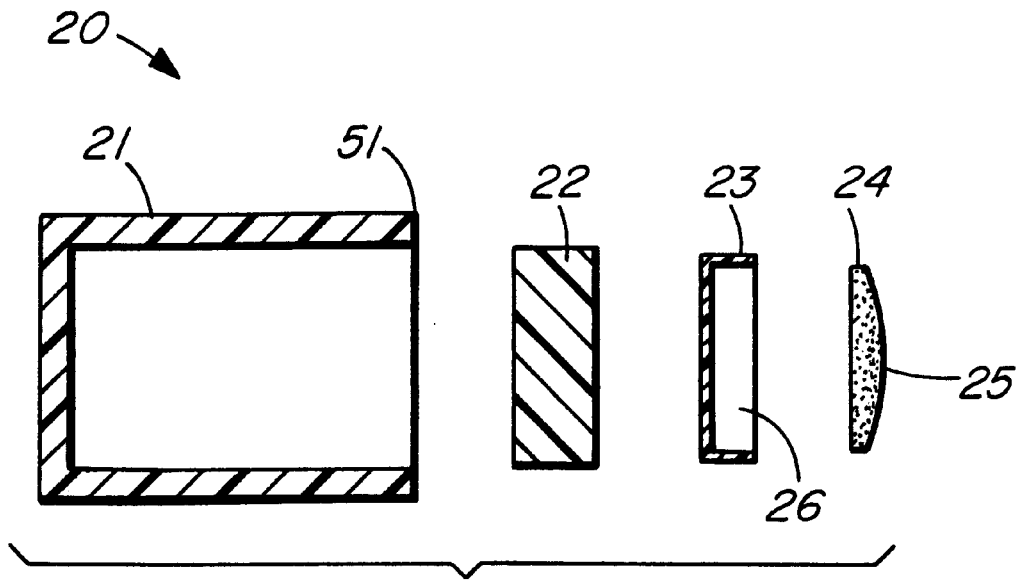
FIG. 4 is an exploded view of the cap from FIG. 1 with the internal components thereof.

The cleaning device has means for biasing the cake 58 against pad 56 when the cap is positioned on end 14 of the barrel. The means in this example, as shown in FIG. 4, is in the form of resilient cylinder 62 of polyurethane foam in this example, although other materials could be substituted. The cylinder is affixed to the inside end 64 of the cap by an adhesive and similarly fixed to bottom 66 of the cup.

Operation

When the cleaning device 10 is being stored or carried about by a photographer or other user of optical instruments, bristles 30 of brush 28 are normally retracted within cylinder 38 by pushing finger grip 32 to the left end of slot 34 from the point of view of FIG. 1. Cap 26 is fitted over portion 18 of the barrel to cover pad member 50. During this time, the pad 56 on the outer end of the pad member is in contact with cake 58 of the cleaning composition and thereby becomes impregnated with the carbon black and hydrated calcium sulfate.

When the user wishes to clean a lens or other optical surface, the brush 28 is normally first used to remove any dust or loose materials on the optical surface. Finger grip 32 is pushed toward end 16 of the barrel to the position shown in FIG. 1 and 3 and the barrel is held like a pen while bristles 30 are used to wipe off any dust or particulate matter from the optical surface.

Once this has been accomplished, cap 26 is removed from end 14 of the barrel and can be pushed onto portion 20 of the barrel at end 16 for temporary storage. The barrel is then held in a pen-like manner with pad member 50 facing the optical surface to be cleaned. The concave outer end of the pad member and pad 56 are shaped to conform with lenses which are usually convex. However, the degree of concavity is greater than typical lenses so contact with all of pad 56 and the optical surface is ensured by pressing pad member 50 against the optical surface. This deflects the periphery of the pad 56 away from the lens and towards the barrel of the cleaning device. The pad can be easily brought flat against even a planar surface by relatively light pressure. In fact, the shape of member 50 allows the cleaning of even concave surfaces. The flexible outer periphery of member 50 flips over to conform to this shape. With the pad held against the optical surface, the cleaning device is moved in a circular motion over the optical surface to clean it. The relatively sharp, circular edge of the pad member 50 ensures that it reaches even the outer edges of the lens or other optical surface being cleaned.

After some usage of the device it may be found that the cleaning performance is less than desired because insufficient cleaning compound is contained on pad 56. When this occurs, cap 26 can be fitted over end 14 of the barrel to the position shown in FIG. 3 and rotated so that pad 56 picks up more of the carbon black and calcium sulfate from cake 58.

Variations and Alternatives

The invention is not limited to the exact configuration of cleaning device 10 described in the example above. The pad member 50 with pad 56 attached could be connected to a body with some other shape than the cylindrical one of barrel 12.

The illustrated embodiment could also be simplified by omitting brush 28. A separate brush could be used for dusting off lenses.

Other pads or cloths impregnated with carbon black could also be used for cleaning lenses.

A separate cake of cleaning composition could be used instead of having cake 58 within cap 26 as described above.

An embodiment with a shorter lifespan could come with a pad 56 impregnated with carbon black, with or without calcium sulfate, without provision for replenishing the cleaning compound on the pad when it becomes exhausted.

The carbon black, with or without calcium sulfate, could also be provided in powdered form instead of the cake. For example, a porous foam pad containing the powder could be provided separately or within cap 26 in place of cake 58.

It will be understood by someone skilled in the art that many of the details provided above are by way of example only and are not intended to limit the scope of the invention which is to be interpreted with reference to the following claims.

What is claimed is:

1. A tool for cleaning of optical surfaces to remove fingerprints and oily deposits therefrom without damaging said surfaces, said tool comprising:

a handle having a first end and a second end; and, a soft wiping pad attached to the first end of the handle, said pad being impregnated with a cleaning compound consisting essentially of a carbon black composition selected from the group consisting of: powdered carbon black, and a cake comprised of carbon black and calcium sulfate.

2. The tool of claim 1 wherein the soft pad comprises a cleaning surface adapted to resiliently conform to a range of convex or concave optical surfaces.

3. The tool of claim 2 wherein the soft pad is comprised of chamois leather.

4. The tool of claim 1 wherein the soft pad is comprised of chamois leather.

5. The tool of claim 1 wherein the soft pad is attached to the handle by a resilient pad member having sides, a first end and a second end, the second end of the resilient pad member being attached to the first end of the handle; the soft pad being attached to the first end of the resilient pad member.

6. The tool of claim 5 wherein the first end of the resilient pad member comprises a concave surface, the concave surface being adapted to resiliently conform to a range of convex or concave optical surfaces, the soft pad being attached to the concave surface of the resilient pad member, the soft pad being adapted to resiliently conform to a range of convex or concave optical surfaces.

7. The tool of claim 6 wherein the sides of the resilient pad member taper inwards from the first end thereof towards the second end thereof.

8. The tool of claim 7 wherein the soft pad is comprised of chamois leather.

9. The tool of claim 5 wherein the soft pad is comprised of chamois leather.

10. A tool for cleaning optical surfaces without damaging said surfaces, said tool comprising:

a handle having a first end and a second end;

a soft pad impregnated with a cleaning compound attached to the first end of the handle said cleaning compound consisting essentially of a carbon black composition selected from the group consisting of powdered carbon black, and a cake comprised of carbon black and calcium sulfate; and, a cap removably attached to the first end of the handle and covering the soft pad, the cap comprising a reservoir of the cleaning compound, the reservoir being positioned to contact the soft pad when the cap is attached to the handle and thereby to impregnate the soft pad with the cleaning compound.

11. The tool of claim 10 wherein the soft pad comprises a cleaning surface adapted to resiliently conform to a range of convex or concave optical surfaces.

12. The tool of claim 10 wherein the reservoir comprises carbon black mixed with hydrated calcium sulfate.

13. The tool of claim 10 wherein the reservoir comprises a cake comprised of approximately 5% carbon black and approximately 95% hydrated calcium sulfate.

14. The tool of claim 13 wherein the cake has a hardness of 2 or less on the Mohs scale.

15. The tool of claim 10 wherein the reservoir comprises a porous pad.

16. The tool of claim 15 wherein the porous pad is comprised of foam.

17. The tool of claim 16 wherein the soft pad is comprised of chamois leather.

18. The tool of claim 10 wherein the soft pad is comprised of chamois leather.

19. The tool of claim 10 further comprising a resilient pad member attaching the soft pad to the handle, the resilient pad member having sides, a first end and a second end, the second end of the resilient pad member being attached to the first end of the handle; the soft pad being attached to the first end of the resilient pad member.

20. The tool of claim 19 wherein the first end of the resilient pad member comprises a concave surface, the concave surface being adapted coresiliently conform to a range of convex or concave optical surfaces, the soft pad being attached to the concave surface of the resilient pad member.

21. The tool of claim 20 wherein the sides of the resilient pad member taper inwards from the first end thereof towards the second end thereof.

22. The tool of claim 21 further comprising a brush located on the second end of the handle.

23. The tool of claim 22 wherein the handle defines a cavity and the brush is movable between a position in the cavity and a position out of the cavity.

24. The tool of claim 23 wherein the brush is mounted on a member which is reciprocatingly received in the cavity, the member comprises a finger grip which extends through a slot in the handle and movement of the brush may be actuated by manipulation of the finger grip.

25. The tool of claim 24 further comprising means for retaining the brush in the position in the cavity or in the position out of the cavity.

26. The tool of claim 19 wherein the reservoir comprises carbon black mixed with hydrated calcium sulfate.

27. The tool of claim 26 wherein the reservoir comprises a cake comprised of approximately 5% carbon black and 95% hydrated calcium sulfate.

28. The tool of claim 27 wherein the cake has a hardness of 2 or less on the Mohs scale.

29. The tool of claim 19 wherein the reservoir comprises a porous pad.

30. The tool of claim 29 wherein the porous pad is comprised of foam.

31. The tool of claim 19 wherein the soft pad is comprised of chamois leather.

32. A method of cleaning an optical surface comprising rubbing the surface with a soft pad or cloth impregnated with carbon black without damaging said surface.

33. The method of claim 24 further comprising impregnating the soft pad or cloth with carbon black by exposing the soft pad or cloth to a carbon black composition selected from the group consisting of: powdered carbon black; and, a cake comprised of carbon black and calcium sulfate.

34. The method of claim 32 wherein the soft pad is comprised of chamois leather.

35. A composition for cleaning optical surfaces without damaging said surfaces, said composition consisting of carbon black and hydrated calcium sulfate.

* * * * *